United States Patent
Gazzino

(10) Patent No.: US 12,454,918 B2
(45) Date of Patent: Oct. 28, 2025

(54) METHOD AND AIRCRAFT PROVIDED WITH AT LEAST ONE COMBUSTION ENGINE AND A DRIVE SYSTEM WITH AT LEAST TWO ELECTRIC MACHINES

(71) Applicant: AIRBUS HELICOPTERS, Marignane (FR)

(72) Inventor: Marc Gazzino, Marseilles (FR)

(73) Assignee: AIRBUS HELICOPTERS, Marignane (FR)

(*) Notice: Subject to any disclaimer, the term of this patent is extended or adjusted under 35 U.S.C. 154(b) by 0 days.

(21) Appl. No.: 18/463,551

(22) Filed: Sep. 8, 2023

(65) Prior Publication Data
US 2024/0125275 A1    Apr. 18, 2024

(30) Foreign Application Priority Data

Oct. 18, 2022    (FR) ...................................... 2210750

(51) Int. Cl.
*F02C 9/00*    (2006.01)
*B64D 27/02*    (2006.01)
(Continued)

(52) U.S. Cl.
CPC ............... *F02C 9/00* (2013.01); *B64D 27/02* (2013.01); *B64D 27/10* (2013.01); *B64D 31/02* (2013.01);
(Continued)

(58) Field of Classification Search
CPC .. F02C 9/00; F02C 6/206; F02C 7/262; F02C 7/275; H02P 9/08; H02P 2101/25;
(Continued)

(56) References Cited

U.S. PATENT DOCUMENTS

| 5,991,683 A * | 11/1999 | Takaoka | ................ B60W 20/00 |
| | | | 903/905 |
| 6,895,741 B2 * | 5/2005 | Rago | ........................ F02C 7/36 |
| | | | 60/793 |

(Continued)

FOREIGN PATENT DOCUMENTS

| EP | 2404775 A2 | 1/2012 |
| EP | 3209563 B1 | 8/2018 |

(Continued)

OTHER PUBLICATIONS

French Search Report for French Application No. FR2210750, Completed by the French Patent Office, Dated May 8, 2023, 9 pages.

*Primary Examiner* — Jason H Duger
(74) *Attorney, Agent, or Firm* — Brooks Kushman P.C.

(57) ABSTRACT

An aircraft provided with a power plant provided with at least one combustion engine mechanically connected to a drive system, the drive system comprising two electric machines each connected to the combustion engine by a kinematic chain, the two electric machines being electrically connected to at least one electrical power source. The aircraft comprises a management system controlling at least a mechanical power or an engine torque delivered by each of the two electric machines as a function of a current operating mode, the management system being configured, during a superior operating mode, to control the two electric machines in order for the two electric machines to deliver different and non-zero mechanical powers or engine torques.

19 Claims, 1 Drawing Sheet

(51) Int. Cl.

| | | |
|---|---|---|
| *B64D 27/04* | (2006.01) | |
| *B64D 27/10* | (2006.01) | |
| *B64D 31/02* | (2006.01) | |
| *B64D 31/18* | (2024.01) | |
| *B64D 33/00* | (2006.01) | |
| *B64D 35/023* | (2025.01) | |
| *F02C 6/20* | (2006.01) | |
| *F02C 7/262* | (2006.01) | |
| *F02C 7/275* | (2006.01) | |
| *F02K 5/00* | (2006.01) | |
| *H02P 9/08* | (2006.01) | |
| *H02P 101/25* | (2016.01) | |
| *H02P 101/30* | (2015.01) | |
| *B64C 27/06* | (2006.01) | |
| *B64D 35/08* | (2025.01) | |

(52) U.S. Cl.
CPC ........... *B64D 31/18* (2024.01); *B64D 35/023* (2024.01); *F02C 6/206* (2013.01); *F02C 7/262* (2013.01); *F02C 7/275* (2013.01); *F02K 5/00* (2013.01); *H02P 9/08* (2013.01); *B64C 27/06* (2013.01); *B64D 27/04* (2013.01); *B64D 33/00* (2013.01); *B64D 35/08* (2013.01); *F05D 2220/329* (2013.01); *H02P 2101/25* (2015.01); *H02P 2101/30* (2015.01)

(58) Field of Classification Search
CPC ........... H02P 2101/305; H02P 2101/30; B64D 27/33; B64D 27/34; B64D 27/02; B64D 27/24; B64D 27/026; B64D 27/04; B64D 27/10; B64D 31/02; B64D 31/18; B64D 33/00; B64D 35/023; B64D 35/08; B64C 27/06; F02K 5/00; F05D 2220/329

See application file for complete search history.

(56) References Cited

U.S. PATENT DOCUMENTS

| | | | | |
|---|---|---|---|---|
| 7,513,120 | B2* | 4/2009 | Kupratis | F02C 3/113 |
| | | | | 60/788 |
| 10,934,935 | B2* | 3/2021 | Dalal | F02C 9/16 |
| 2007/0245709 | A1* | 10/2007 | Dooley | F02C 7/262 |
| | | | | 60/767 |
| 2008/0276620 | A1* | 11/2008 | Ullyott | F01D 21/06 |
| | | | | 60/773 |
| 2012/0025032 | A1 | 2/2012 | Hopdjanian et al. | |
| 2013/0219905 | A1 | 8/2013 | Marconi et al. | |
| 2017/0247114 | A1 | 8/2017 | Moulon et al. | |
| 2018/0187604 | A1 | 7/2018 | Poumarede et al. | |
| 2019/0264615 | A1 | 8/2019 | Husband et al. | |
| 2020/0277072 | A1* | 9/2020 | Zoppitelli | H02P 1/46 |
| 2021/0101691 | A1* | 4/2021 | Mark | B64D 31/06 |
| 2021/0355893 | A1* | 11/2021 | Frantz | B64D 27/026 |
| 2022/0063819 | A1* | 3/2022 | Murrow | B64D 31/18 |
| 2023/0017954 | A1* | 1/2023 | Allias | B64D 35/021 |
| 2023/0348085 | A1* | 11/2023 | Prabhakaran | B64D 31/18 |

FOREIGN PATENT DOCUMENTS

| | | |
|---|---|---|
| FR | 2967133 A1 | 5/2012 |
| FR | 3019215 A1 | 10/2015 |

* cited by examiner

METHOD AND AIRCRAFT PROVIDED WITH AT LEAST ONE COMBUSTION ENGINE AND A DRIVE SYSTEM WITH AT LEAST TWO ELECTRIC MACHINES

CROSS-REFERENCE TO RELATED APPLICATIONS

This application claims priority to French patent application No. FR 2210750 filed on Oct. 18, 2022, the disclosure of which is incorporated in its entirety by reference herein.

TECHNICAL FIELD

The present disclosure relates to a method and an aircraft provided with at least one combustion engine and a drive system with at least two electric machines.

BACKGROUND

An aircraft may comprise at least two combustion engines. For example, a rotorcraft may comprise at least two combustion engines setting at least one rotor in motion via a mechanical system.

A combustion engine may be a turboshaft engine. A turboshaft engine usually comprises a gas generator and at least one power turbine. The gas generator is provided with a compressor assembly, a combustion chamber and at least one expansion turbine constrained to rotate with the compressor assembly by a connecting shaft. The compressor assembly and the expansion turbine or turbines form a mobile system of the gas generator. The power turbine may be free, i.e., mechanically disengaged from the mobile system in rotation, being rotated by the gases exiting the gas generator. In addition, the power turbine mechanically rotates an output shaft of the turboshaft engine, directly or indirectly.

A combustion engine may be a piston engine also provided with a mobile system.

Furthermore, the mobile system of a combustion engine may be mechanically connected to a drive system. Such a drive system conventionally comprises an electrical power source, a power distribution system and an electric machine. The electric machine is in particular configured to set the mobile system in motion during a starting phase. This electric machine may be an electric motor only capable of operating in motor mode, or an electric machine that is able to operate in an electric motor mode and an electric generator mode, as required. In the electric generator mode, an electric machine is set in motion in order to generate electrical power.

Such a simplex drive system is sufficient for conventional rotorcraft use. Indeed, if the drive system breaks down, the starting procedure of the engine in question is stopped before flight. The rotorcraft then remains on the ground.

However, a rotorcraft power plant may be dimensioned so as to be able to render a combustion engine of the power plant inactive during certain flight phases. The rotorcraft may then comprise an enhanced restart system to ensure that such a combustion engine can be restarted if it has been rendered inactive.

According to another aspect, an electric machine may be used in order to set the mobile system of a combustion engine in motion during a stopping phase of the combustion engine. Setting the mobile system in motion in this way allows hot gases to be discharged during a ventilation operating mode.

Modifying an existing power plant in order to add an operating mode, and, for example, in order to implement a superior operating mode during flight or an operating mode for ventilation, may mean completely redefining the drive system.

Document FR 2 967 133 describes a twin-engine helicopter provided with two turboshaft engines each comprising a gas generator and a free turbine. Each gas generator cooperates with active drive means capable of keeping the mobile system of the gas generator in rotation while the combustion chamber is switched off. The rotorcraft also comprises an emergency assistance device comprising near-instantaneous firing means to be used if a conventional restart has failed.

Document EP 3 209 563 describes a multi-engine aircraft. At least one first turboshaft engine is capable of operating in at least one standby speed when the aircraft is in stabilized flight, while other turboshaft engines are operating. The turboshaft engine in standby is associated with identical first and second electrotechnical systems each comprising an electric machine connected to an electronic power module. The electronic power module is connected to a specific electrical power supply network and to at least one electrical power storage member. The electrotechnical systems may be active simultaneously in order to deliver identical power or one electrotechnical system may be active while the other electrotechnical system is inactive.

Document FR 3 019 215 describes an aircraft comprising at least two free turbine turboshaft engines. One electric machine may set the gas generator of a first turboshaft engine in motion while being powered with the electrical power produced by an electric machine driven by a second turboshaft engine.

Documents US 2019/264615 A1 and EP 2 404 775 A2 are also known.

SUMMARY

An object of the present disclosure is thus to propose an innovative aircraft intended to allow multiple uses of a combustion engine drive system.

The disclosure therefore relates to an aircraft provided with a power plant provided with at least one combustion engine for setting a power transmission system in motion, the combustion engine being mechanically connected to a drive system capable of setting a mobile system of the combustion engine in motion, the drive system comprising two electric machines each connected to the combustion engine by a kinematic chain, the two electric machines being electrically connected to at least one electrical power source.

The aircraft comprises a management system controlling at least a mechanical power or an engine torque delivered by each of the two electric machines as a function of a current operating mode, said management system being configured, during at least one superior operating mode, to control the two electric machines in order for the two electric machines to simultaneously deliver different and non-zero mechanical powers or engine torques.

A superior operating mode may be applicable during flight.

The power plant may optionally comprise two combustion engines, each combustion engine cooperating with a respective drive system according to the disclosure.

The expression "combustion engine" denotes an engine burning fuel in order to set an output shaft in motion, such as a turboshaft engine or a piston engine, for example.

The aircraft therefore comprises at least one drive system capable of setting a mobile system of the combustion engine in motion, such as a compressor assembly and an expansion assembly of a gas generator of a turboshaft engine or a crankshaft of a piston engine, for example.

This drive system comprises two electric machines each capable of setting the mobile system of the combustion engine in motion.

Moreover, a management system controls the drive system. The term "management system" denotes a system that is able to generate commands that are transmitted directly or indirectly via a controller to the electric machines in order to request a particular operation.

The management system can control the electric machines according to at least one or indeed a plurality of different operating modes.

In particular, the management system can apply at least one operating mode referred to as the "superior" operating mode, while on the ground or during flight.

The mechanical powers or the engine torques transmitted to the combustion engine by the two electric machines are not necessarily balanced between the two electric machines.

During a basic operating mode, only one electric machine can be controlled to develop engine torque. Such a basic operating mode may comprise a normal starting mode of the combustion engine on the ground or indeed a ventilation mode.

During a superior operating mode, one of the electric machines can be controlled to provide a power, the other electric machine being controlled to provide a higher power in order to perform an optional function, for example in order to implement a fast restart of an inactive combustion engine during flight. Such a superior operating mode may comprise a restart mode of the combustion engine on the ground, a fast start-up mode of the combustion engine during flight, or others.

When a combustion engine is described as "inactive", this means that the combustion engine in question does not develop any power or develops a power lower than a threshold. The inactive combustion engine may be completely stopped or may be idling.

For example, the mobile system may be kept rotating, possibly by means of the drive system. The free turbine of a free turbine turboshaft engine may be stopped, for example.

The aircraft may therefore comprise two electric machines dimensioned to perform the basic functions, but also, if necessary, optional functions during a superior operating mode. In any case, the management system is configured to ensure that the engine torque and/or the mechanical power transmitted to the combustion engine fulfils the mechanical drive requirement (speed, acceleration) corresponding to the current operating mode.

One of the electric machines may possibly be removable and be installed only for a mission that requires operation in a superior operating mode.

The two electric machines may also be controlled by the management system in order to set the mobile system of a combustion engine in motion, possibly in degraded but sufficient conditions, in the event that one of the two electric machines fails.

The aircraft may also include one or more of the following features.

According to one possibility, the two electric machines may comprise one electric machine such as an electric motor or generator/starter and another electric machine such as an electric motor or generator/starter.

The expression "generator/starter" denotes an electric machine that can be used as an electric motor or an electric generator, as required.

For example, a first electric machine is an electric motor, a second electric machine being a generator/starter. By default, the management system may instruct the first electric machine to set the mobile system of the combustion engine in motion, and the second electric machine to operate in motor mode in order to provide the combustion engine with additional mechanical power and/or engine torque during a superior operating mode and/or to replace the first electrical machine in the event of a failure.

According to another example, the first electric machine is a generator/starter, the second electric machine also being a generator/starter. This configuration provides total redundancy.

According to one possibility compatible with the preceding possibilities, the two electric machines may comprise one electric machine whose engine torque is not regulated and another electric machine whose engine torque is regulated.

The first electric machine whose engine torque is not regulated provides a set engine torque regardless of the operating mode when instructed by the management system. Conversely, the management system controls the torque setpoint of the second electric machine in order for the drive system to provide the combustion engine with the engine torque required by the current operating mode.

According to one possibility compatible with the preceding possibilities, each electric machine may deliver a maximum power dimensioned to start the combustion engine alone during a basic operating mode, the management system being configured during said at least one superior operating mode to control one of the two electric machines to deliver said maximum power and the other electric machine to deliver an additional power.

For example, the management system may control one of the electric machines to set the combustion engine in motion during a basic operating mode, for example during start-up. The other electric machine is optionally at rest, either being inactive or, if required, put into operation in an electrical power generator mode. The basic operating mode may allow normal start-up, ventilation of the engine or maintenance action, for example.

When an electric machine is described as "inactive", this means that the electric machine does not develop any driving power.

Conversely, during a superior operating mode, the management system may control the two electric machines at rest to provide a power equal to the sum of the maximum power and an additional power, for example in order to perform a fast start-up, to reactivate an inactive combustion engine during flight, or others.

According to one possibility compatible with the preceding possibilities, the management system may be configured during a basic operating mode to make only one of the two electric machines operate.

According to one possibility compatible with the preceding possibilities, the aircraft may comprise a human-machine interface transmitting an operation signal to the management system, said operation signal carrying an operating mode to be applied, the management system being configured to control said two electric machines as a function of said operating mode to be applied.

Such a human-machine interface may comprise a knob or a touch-sensitive, voice, visual or other interface.

A pilot may therefore specify the operating mode to be applied by operating the human-machine interface, the operating mode to be applied becoming the current operating mode.

According to one possibility compatible with the preceding possibilities, the aircraft may comprise a total power sensor connected to the management system, the total power sensor generating at least one total power signal carrying information relating to a mechanical power or to an engine torque transmitted to the combustion engine by the two electric machines, said management system being configured to control the two electric machines as a function at least of the current operating mode and the total power signal.

The total power sensor may comprise a standard torquemeter.

The two electric machines may have different features and topologies. The management system controls the electric machines in order for the engine torque and/or the mechanical power transmitted to the combustion engine to meet the requirement of the current operating mode. To this end, the management system may be configured to take into consideration at least the engine torque and/or the mechanical power transmitted to the combustion engine. The management system may apply a regulation method for regulating at least one of the two electric machines so that at least the engine torque or the mechanical power transmitted to the combustion engine tends towards a predetermined value.

An electric machine may optionally comprise a torque regulation system, the management system transmitting a torque setpoint to this electric machine. For example, the electric machine may be a synchronous machine with magnets or with a wound rotor and a control inverter.

According to one possibility compatible with the preceding possibilities, the aircraft may comprise at least one driving power sensor connected to the management system, the driving power sensor generating at least one driving power signal carrying information relating to a mechanical power or to an engine torque generated by one of the two electric machines, said management system being configured to control the two electric machines as a function at least of the current operating mode and the driving power signal.

The driving power sensor may comprise a standard torquemeter. The driving power sensor may comprise a sensing device for measuring the electric current consumed by the electric machine, this measurement of the consumed electric current being a reflection of the engine torque developed by the electric machine.

The management system may control the electric machine so that the torque developed by an electric machine tends towards a threshold, for example.

According to one possibility compatible with the preceding possibilities, the aircraft may comprise a total operation sensor connected to the management system, the total operation sensor generating a total operation signal carrying information that varies as a function of whether the combustion engine is in a started or non-started state, said management system being configured to control the two electric machines at least as a function of the current operating mode and total operation signal.

The management system may be configured to control the electric machines in a predetermined manner. The management system may determine whether the combustion engine is actually started.

According to one example, an engine computer transmits this information to the management system. According to another example, a sensor may measure a gas temperature in the combustion engine and/or a speed of rotation of a mobile system of the combustion engine, the management system comparing the transmitted values to thresholds in order to determine whether the combustion engine is started or not started.

If the combustion engine is started, the management system may stop the electric machine or machines or may activate an electrical power generator operating mode in order to generate electrical power.

If a combustion engine is not started, the management system may apply a predetermined emergency procedure in order to attempt to restart the combustion engine. For example, during a first test, the management system may use a first electric machine to generate a maximum power and may use the other electric machine for this purpose during a second test in order to compensate for any fault in the first electric machine.

According to one possibility compatible with the preceding possibilities, the aircraft may comprise one electrical operation sensor for each electric machine connected to the management system, each electrical operation sensor generating an electrical operation signal carrying data that varies as a function of whether the associated electric machine is in an active or failed state, said management system being configured to control the two electric machines at least as a function of the current operating mode and the electrical operation signals.

The management system can assess whether an electric machine is faulty and can, if required, apply a predetermined emergency procedure.

According to one possibility, the management system is configured to control the two electric machines as a function of the current operating mode, the total power signal, the driving power signal or signals, the total operation signal and the electrical operation signals.

According to one possibility compatible with the preceding possibilities, the aircraft may comprise one contactor for each electric machine, each contactor being interposed electrically between an electric machine and said at least one electrical power source, each contactor being controlled by the management system.

The management system may close or open a contactor as required.

According to one possibility compatible with the preceding possibilities, the combustion engine optionally being able to be inactive during flight, said at least one superior operating mode may comprise a restart operating mode for restarting, during flight, the combustion engine that has been rendered inactive.

According to another aspect, an aircraft according to the disclosure may implement a particular method.

The disclosure therefore relates to a method for controlling a power plant of an aircraft provided with at least one combustion engine for setting a power transmission system in motion, the combustion engine being mechanically connected to a drive system capable of setting a mobile system of the combustion engine in motion, the drive system comprising two electric machines each connected to the combustion engine by a kinematic chain, the two electric machines being electrically connected to at least one electrical power source.

This method comprises, during a superior operating mode, operation of the two electric machines in motor mode under the control of a management system, the two electric machines delivering different and non-zero mechanical powers or engine torques.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
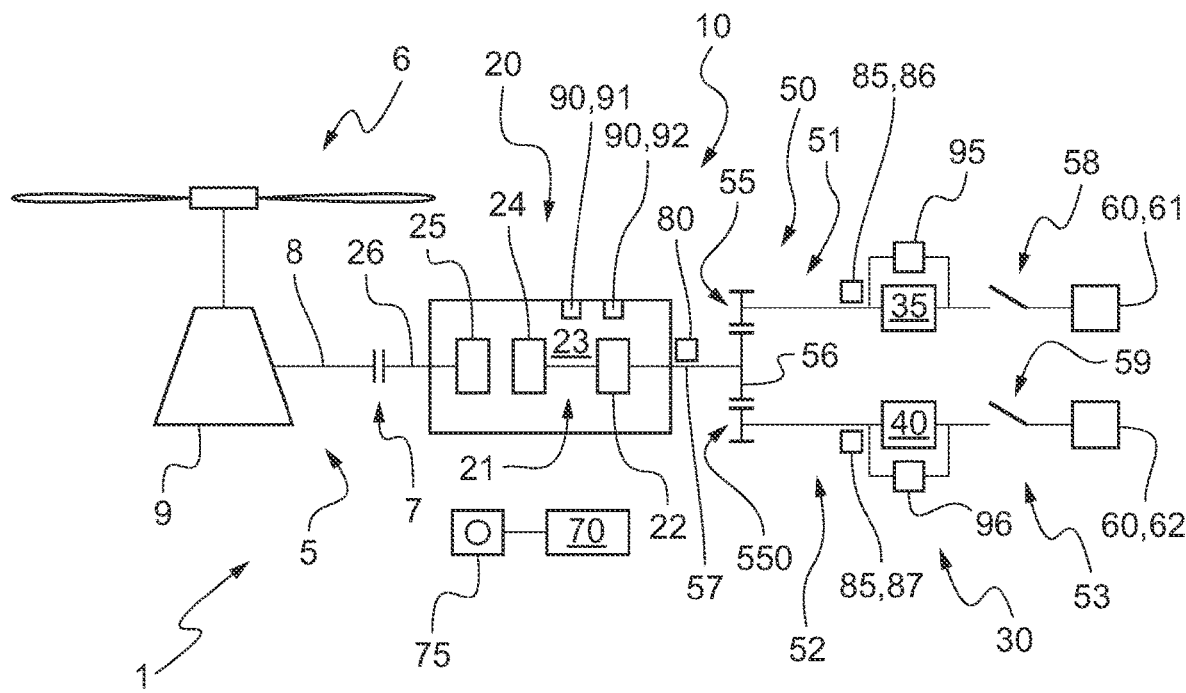
FIG. 1 shows a single-engine aircraft according to the disclosure.
Figure 2:
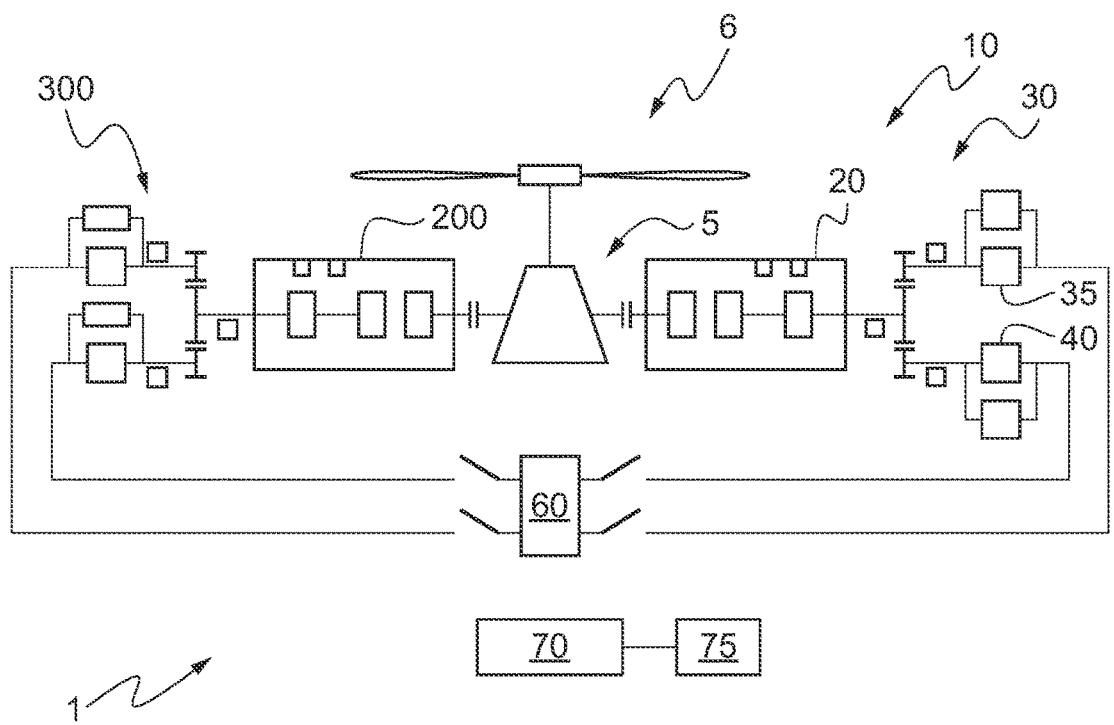
FIG. 2 shows a multi-engine aircraft according to the disclosure.

FIGS. 1 and 2 show examples of aircraft 1 according to the disclosure. FIG. 1 shows a single-engine aircraft whereas FIG. 2 shows a multi-engine aircraft.

In reference to FIG. 1, irrespective of the example, the aircraft 1 is therefore provided with a power plant 10 provided with at least one combustion engine 20.

The combustion engine 20 is provided with a mobile system 21 and an output shaft 26.

The combustion engine 20 may be a turboshaft engine, for example. The turboshaft engine comprises a gas generator that is provided successively with a compressor assembly 22, a combustion chamber 23 and at least one expansion turbine 24 constrained to rotate with the compressor assembly 22 by a connecting shaft. The compressor assembly 22 and the expansion turbine or turbines 24 form the mobile system 21 of the gas generator. The turboshaft engine further comprises at least one power turbine 25, which may be free or linked to the expansion turbine or turbines 24 and is rotated by the gas from the gas generator. The power turbine 25 mechanically rotates an output shaft 26 of the turboshaft engine, directly or indirectly.

According to another example, the combustion engine 20 may be a piston engine also provided with a mobile system 21 and an output shaft 26.

Irrespective of the nature of the combustion engine 20, its output shaft 26 may be connected to a power transmission system 5. The power transmission system 5 may lead to a rotary wing 6.

The power transmission system 5 may comprise at least one mechanical connector 7, at least one transmission shaft 8, at least one gearbox 9, etc. According to the example shown, the power transmission system 5 comprises a mechanical connector 7 connected to the output shaft 26 of the combustion engine 20, this mechanical connector 7 being connected to an input shaft 8 of a gearbox 9 directly or via at least one intermediate shaft. The gearbox 9 further comprises a rotor mast constrained to rotate a rotary wing 6.

Irrespective of these aspects, the combustion engine 20 is mechanically connected to a drive system 30. The drive system 30 is in particular capable of setting the mobile system 21 of the combustion engine 20 in motion, for example in order to start or restart the combustion engine 20 or in order to ventilate the combustion engine 20. The drive system 30 may possibly generate an electrical power by taking mechanical energy off the mobile system 21 during certain phases.

This drive system 30 comprises at least two electric machines 35, 40. The two electric machines 35, 40 each comprise a working shaft connected by a kinematic chain 50 to the combustion engine 20, and in particular to its mobile system 21.

Such a kinematic chain 50 may comprise a first mechanical connection 51 connected to one electric machine 35 and a second mechanical connection 52 connected to another electric machine 40. Each mechanical connection 51, 52 may comprise at least one shaft, at least one mechanical connector, at least one bearing, at least one free-wheel or a clutch, etc. Moreover, the kinematic chain 50 may comprise a gear 55, 56, 550 for combining the first mechanical connection 51 and the second mechanical connection 52 and connecting them to a connecting link 57 secured to the mobile system 21 of the combustion engine 20. The connecting link 57 may comprise at least one shaft, at least one mechanical connector, at least one bearing, etc. According to the example shown, the first mechanical connection 51 and the second mechanical connection 52 are respectively secured to a first pinion 55 and a second pinion 550 which mesh with a combining gear 56, this combining gear 56 being secured to a shaft of the connecting link 57.

For example, at least one electric machine 35, 40 may be an electric motor that can only convert electrical power into mechanical energy in order to set the mobile system 21 in motion. At least one electric machine 35, 40 may possibly be a generator/starter that can function alternately in an electric motor mode and an electrical power generator mode, as required.

Each electric machine may comprise a standard controller, this controller controlling the operation of the electric machine.

According to one example, one of the two electric machines 35, 40 may be an electric motor and the other electric machine 35, 40 may be a generator/starter.

According to one feature, each electric machine 35, 40 may be defined to deliver a power that can increase up to a power referred to as the "maximum power". This maximum power is greater than or equal to the minimum power required to start the combustion engine 20. Each electric machine 35, 40 may then be used to start the combustion engine 20.

One of the two electric machines 35, 40 may possibly be an electric machine whose engine torque is not regulated and the other electric machine 35, 40 may be an electric machine whose engine torque is regulated. Therefore, the engine torque, or the mechanical power, that can be delivered to the mobile system 21 can be adjusted by regulating the engine torque delivered by the electric machine 35, 40 whose engine torque is regulated.

According to one feature, the two electric machines 35, 40 are electrically connected to an electricity network 53 comprising at least one electrical power source 60. An electrical power source 60 may possibly be rechargeable.

For example, an electrical power source 60 may comprise a ground connection, an electric battery, a fuel cell, a rechargeable, non-rechargeable or super-capacity battery, or others.

In the case of a rechargeable electrical power source 60, this electrical power source 60 may be recharged by an electric machine 35, 40 in generator mode or by another on-board source.

For example, an electrical power source 60 may be shared by several electric machines 35, 40, or may be dedicated to one electric machine 35, 40. The example shown comprises a first electrical power source 61 electrically connected to only one electric machine 35, and a second electrical power source 62 electrically connected to only one other electric machine 40. The electrical power source may be driven by the connecting link 57, the output shaft 26 or the mechanical gearbox 9.

The aircraft 1 possibly comprises one contactor 58, 59 for each electric machine 35, 40. Each contactor 58, 59 is arranged electrically between an electric machine 35, 40 and the electrical power source or sources 60 connected to this electric machine 35, 40. Each contactor 58, 59 therefore allows the associated electric machine 35, 40 to be connected to or disconnected from its electrical power source or sources 61, 62.

Moreover, the aircraft 1 comprises a management system 70. The management system 70 may comprise one or more processing units. A processing unit may, for example, comprise at least one processor and at least one memory, at least one integrated circuit, at least one programmable system, at least one logic circuit, these examples not limiting the scope given to the expression "processing unit". The term "processor" may refer equally to a central processing unit (CPU), a graphics processing unit (GPU), a digital signal processor (DSP), a microcontroller, etc.

If appropriate, the management system 70 is connected with each contactor 58, 59. Each contactor 58, 59 may thus be closed or opened when instructed by the management system 70.

The management system 70 is configured to control the operation of the two electric machines 35, 40 of the drive system 30, by sending a control setpoint via a signal, for example an analogue or digital signal, to the electric machine 35, 40, and possibly to its controller, and/or by opening or closing a contactor 58, 59. To this end, the management system may store and apply an algorithm generating control commands based on input data.

In particular, the purpose of the management system 70 is to control the operation of the two electric machines 35, 40 as a function of a current operating mode. The current operating mode may be configurable using a human-machine interface 75 connected via a wired or wireless link to the management system 70. In particular, the human-machine interface 75 may transmit an analogue or digital operation signal carrying the operating mode to be applied. The management system 70 is configured to receive the operation signal, possibly decode it, and control the two electric machines 35, 40 according to the operating mode to be applied.

In order to control the electric machines 35, 40, the management system 70 may be connected via a wired or wireless link with one or more of the following sensors.

The term "sensor" denotes a system comprising one or more sensing devices for measuring the value of a parameter. The term "sensing device" denotes a physical sensing device capable of directly measuring the parameter in question or a system that may comprise one or more physical sensing devices as well as means for processing the signal that make it possible to provide an estimation of the parameter from the measurements provided by this or these physical sensing devices. Similarly, the value of a parameter may correspond to a raw measurement from a physical sensing device or to a measurement obtained by relatively complex processing of raw measurement signals.

Therefore, the aircraft 1 may comprise a total power sensor 80 connected via a wired or wireless link to the management system 70. The total power sensor 80 transmits at least one total power signal carrying information relating to a mechanical power or to an engine torque transmitted to the combustion engine 20 by the two electric machines 35, 40.

The total power sensor 80 may comprise a torquemeter, and indeed a speed sensor, arranged on the kinematic chain 50 and, for example, on the connecting link 57.

The management system 70 may then be configured to control the two electric machines 35, 40 as a function at least of the current operating mode and the total power signal.

The aircraft 1 may comprise at least one driving power sensor 85 connected via a wired or wireless link to the management system 70, or indeed one driving power sensor 86, 87 for each electric machine.

Each driving power sensor 85 transmits at least one driving power signal carrying information relating to a mechanical power or an engine torque generated by an electric machine 35, 40.

A driving power sensor 85 may comprise a torquemeter, and indeed a speed sensor, arranged on the kinematic chain 50 and, for example, on the associated mechanical connection 51, 52, or on the working shaft of the electric machine 35, 40.

A driving power sensor 85 may comprise a measuring sensing device 95, 96 measuring an electric current consumed by the electric machine 35, 40, this measurement of the consumed electric current being a reflection of the developed engine torque.

The management system 70 may then be configured to control the two electric machines 35, 40 as a function at least of the current operating mode and the driving power signal or signals.

The aircraft 1 may comprise a total operation sensor 90 connected via a wired or wireless link to the management system 70. The total operation sensor 90 transmits at least one total operation signal carrying information that varies as a function of whether the combustion engine 20 is in a started or non-started state.

A total operation sensor 90 may comprise a temperature sensor 91 measuring a temperature of the gases in the combustion engine and/or a speed sensor 92 measuring a speed of the mobile system 21.

The management system 70 may then be configured to control the two electric machines 35, 40 as a function at least of the current operating mode and the total operation signal or signals.

The aircraft 1 may comprise one electrical operation sensor 95, 96 for each electric machine 35, 40 connected via a wired or wireless link to the management system 70. An electrical operation sensor 35, 40 transmits an electrical operation signal carrying data that varies as a function of whether the associated electric machine is in an active or failed state.

An electrical operation sensor 95, 96 may comprise a measuring sensing device measuring an electric current consumed by the electric machine 35, 40. If the consumed electric current is different from an expected electric current, possibly to within a margin, the management system can deduce the existence of a failure, for example.

The management system 70 may then be configured to control the two electric machines 35, 40 as a function at least of the current operating mode and the electrical operation signals.

For example, the current operating mode may be a basic operating mode. During such a basic operating mode, the management system 70 may be configured to make only one of the two electric machines 35, 40 operate in motor mode. For example, the management system may, if required, close the contactor 58 of a predetermined electric machine 35 and open the contactor 59 of the other electric machine 40, and/or may transmit a setpoint to the electric machine 35, 40 that is to be made to operate in motor mode.

For example, such a basic operating mode may comprise simply starting up the combustion engine 20. The management system 70 may then, according to one example, close the contactor 58 of a predetermined electric machine 35 and open the contactor 59 of the other electric machine 40. This electric machine 35 may be configured to deliver a mechanical power that is not regulated and can thus develop the maximum power in order to start the combustion engine 20. Alternatively, the management system 70 may then, according to one example, close the contactor 58 of a predetermined electric machine 35 to make it operate in motor mode, and close the contactor 59 of the other electric machine 40 to make it operate in electric generator mode.

If there is an electric machine 35, 40 whose engine torque is regulated, the management system 70 may then, according to one example, close the contactor 58 of the predetermined electric machine 35, open the contactor 59 of the other electric machine 40, and transmit a predetermined setpoint to the electric machine 35 that is to be made to operate in motor mode. For example, the management system 70 establishes the setpoint or setpoints depending in particular on an engine torque measured with a total power sensor 80 or a driving power sensor 85. The management system 70 may establish the setpoint or setpoints with the mechanical power transmitted to the combustion engine 20 in order to reach a stored threshold or a stored range of values corresponding to the current operating mode and/or in order for the engine torque transmitted to the combustion engine 20 to reach a stored threshold or a stored range of values corresponding to the current operating mode. The management system 70 may also determine whether the electric machine 35, 40 that is to be made to operate in motor mode has failed, by using the electrical operation sensor 95, and may, if required, deactivate this electric machine 35, 40 and activate the other electric machine 35, 40 in order to make it operate in motor mode.

Such a basic operating mode may comprise the ventilation of a combustion engine 20. This ventilation may be implemented by applying the above method, for example.

Irrespective of whether or not it is possible to implement a basic operating mode, the current operating mode may be a superior operating mode. The terms "superior" and "basic" are used to distinguish between the operating modes.

The management system 70 is configured, during a superior operating mode, to make the two electric machines 35, 40 operate in motor mode at the same time. During a superior operating mode, the two electric machines 35, 40 are controlled to deliver different and non-zero mechanical powers or engine torques.

For example, the management system 70 is configured, during a superior operating mode, to control one of the two electric machines 35, 40 to deliver the maximum power and the other electric machine 40, 35 to deliver an additional power lower than the maximum power. The applied method then comprises operating the two electric machines 35, 40 in motor mode under the control of the management system 70, the two electric machines 35, 40 delivering different and non-zero mechanical powers or engine torques.

The management system 70 may then, if required, close the contactors 58, 59 of the electric machines 35, 40. If one of the electric machines 35,40 is not regulated, this electric machine 35,40 then provides its maximum power. For each regulated electric machine 35, 40, the management system 70 may generate a setpoint and transmit it to the electric machine 35, 40. For example, the management system 70 establishes the setpoint depending in particular on an engine torque measured with a total power sensor 80 or a driving power sensor 85. The management system 70 may also determine whether an electric machine 35, 40 has failed, by using the electrical operation sensor 95, 96, and may, if required, implement a predetermined backup mode. Such a backup mode may involve operating the remaining electric machine 35, 40 so that a parameter reaches a predetermined value, for example the mechanical power and/or the engine torque generated by the electric machine 35, 40 that is still operating.

FIG. 2 shows a multi-engine aircraft 1, in particular a twin-engine aircraft. Each combustion engine 20, 200 is associated with its own drive system 30, 300 of the kind described above. An electrical power source 60 is optionally shared by the two drive systems 30, 300.

At least one combustion engine 20, 200 may be rendered inactive during flight. The drive system 30, 300 may optionally be able to implement a basic operating mode in order to keep the mobile system 21 in motion, the combustion chamber possibly being switched off.

A superior operating mode then comprises a restart operating mode for quickly restarting the combustion engine 20, 200 during flight.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. An aircraft provided with a power plant provided with at least one combustion engine having a power turbine that mechanically rotates an output shaft configured to set a gearbox of a power transmission system in motion, the combustion engine being mechanically connected to a drive system capable of setting a mobile system of the combustion engine in motion, the mobile system of the combustion engine being a turbine constrained to rotate with a compressor by a connecting shaft, the mobile system having a shaft of a connecting link secured thereto, the power turbine being free of the mobile system, the drive system comprising two electric machines each connected to the mobile system of the combustion engine by a kinematic chain and each electric machine being capable of setting the mobile system of the combustion engine in motion, the kinematic chain including a first mechanical connection that is connected between a first one of the electric machines and a combining gear secured to the shaft of the connecting link to connect the first one of the electric machines to the mobile system and the kinematic chain further including a second mechanical connection that is connected between a second one of the electric machines and the combining gear secured to the shaft of the connecting link to connect the second one of the electric machines to the mobile system, the two electric machines being electrically connected to at least one electrical power source, wherein the aircraft comprises a management system controlling at least a mechanical power or an engine torque delivered by each of the two electric machines as a function of a current operating mode, the management system being configured, during a first operating mode, to control the two electric machines in order for the two electric machines to simultaneously deliver different and non-zero mechanical powers or engine torques.

2. The aircraft according to claim 1,
wherein one of the two electric machines is an electric motor or generator/starter and the other electric machine is an electric motor or generator/starter.

3. The aircraft according to claim 1,
wherein the two electric machines simultaneously deliver different and non-zero engine torques, the engine torque of one of the two electric machines is not regulated and the engine torque of the other electric machine is regulated.

4. The aircraft according to claim 1,
wherein each electric machine delivers a maximum power dimensioned to start the combustion engine alone during a second operating mode, the management system being configured during the first operating mode to control one of the two electric machines to deliver the maximum power and the other electric machine to deliver an additional power.

5. The aircraft according to claim 1,
wherein the management system is configured during a second operating mode to make only one of the two electric machines operate.

6. The aircraft according to claim 1,
wherein the aircraft comprises a human-machine interface transmitting an operation signal to the management system, the operation signal carrying an operating mode to be applied, the management system being configured to control the two electric machines as a function of the operating mode to be applied.

7. The aircraft according to claim 1,
wherein the aircraft comprises a total power sensor connected to the management system, the total power sensor generating at least one total power signal carrying information relating to a mechanical power or to an engine torque transmitted to the combustion engine by the two electric machines, the management system being configured to control the two electric machines as a function at least of the current operating mode and the total power signal.

8. The aircraft according to claim 1,
wherein the aircraft comprises at least one driving power sensor connected to the management system, the driving power sensor generating at least one driving power signal carrying information relating to a mechanical power or to an engine torque generated by one of the two electric machines, the management system being configured to control the two electric machines as a function at least of the current operating mode and the driving power signal.

9. The aircraft according to claim 1,
wherein the aircraft comprises a total operation sensor connected to the management system, the total operation sensor generating a total operation signal carrying information that varies as a function of whether the combustion engine is in a started or non-started state, the management system being configured to control the two electric machines at least as a function of the current operating mode and the total operation signal.

10. The aircraft according to claim 1,
wherein the aircraft comprises one electrical operation sensor for each electric machine connected to the management system, each electrical operation sensor generating an electrical operation signal carrying data that varies as a function of whether the associated electric machine is in an active or failed state, the management system being configured to control the two electric machines at least as a function of the current operating mode and the electrical operation signals.

11. The aircraft according to claim 1,
wherein the aircraft comprises one contactor for each electric machine, each contactor being interposed electrically between the respective electric machine and the at least one electrical power source, each contactor being controlled by the management system.

12. The aircraft according to claim 1,
wherein the combustion engine is able to be inactive during flight, the first operating mode comprises a restart operating mode for restarting, during flight, the combustion engine that has been rendered inactive.

13. The aircraft according to claim 1,
wherein the combustion engine is a turboshaft engine.

14. The aircraft according to claim 1,
wherein the combustion engine comprises a gas generator.

15. A method for controlling a power plant of an aircraft provided with at least one combustion engine having a power turbine that mechanically rotates an output shaft configured to set a gearbox of a power transmission system in motion, the combustion engine being mechanically connected to a drive system capable of setting a mobile system of the combustion engine in motion, the mobile system of the combustion engine being a turbine constrained to rotate with a compressor by a connecting shaft, the mobile system having a shaft of a connecting link secured thereto, the power turbine being free of the mobile system, the drive system comprising two electric machines each connected to the mobile system of the combustion engine by a kinematic chain and each electric machine being capable of setting the mobile system of the combustion engine in motion, the kinematic chain including a first mechanical connection that is connected between a first one of the electric machines and a combining gear secured to the shaft of the connecting link to connect the first one of the electric machines to the mobile system and the kinematic chain further including a second mechanical connection that is connected between a second one of the electric machines and the combining gear secured to the shaft of the connecting link to connect the second one of the electric machines to the mobile system, the two electric machines being electrically connected to at least one electrical power source,
wherein the method comprises, during a first operating mode, operation of the two electric machines in motor mode under the control of a management system, the two electric machines delivering different and non-zero mechanical powers or engine torques.

16. An aircraft provided with a power plant provided with at least one combustion engine having a power turbine that mechanically rotates an output shaft configured to set a gearbox of a power transmission system in motion, the combustion engine being mechanically connected to a drive system capable of setting a mobile system of the combustion engine in motion, the mobile system of the combustion engine being a turbine constrained to rotate with a compressor by a connecting shaft, the mobile system having a shaft of a connecting link secured thereto, the power turbine being free of the mobile system, the drive system comprising two electric machines each connected to the mobile system of the combustion engine by a kinematic chain and each electric machine being capable of setting the mobile system of the combustion engine in motion, the kinematic chain including a first mechanical connection that is connected between a first one of the electric machines and a combining gear secured to the shaft of the connecting link to connect the first one of the electric machines to the mobile system and the kinematic chain further including a second mechanical connection that is connected between a second one of the electric machines and the combining gear secured to the shaft of the connecting link to connect the second one of the electric machines to the mobile system, the two electric machines being electrically connected to at least one electrical power source, wherein the aircraft comprises a management system controlling at least a mechanical power or an engine torque delivered by each of the two electric machines as a function of a current operating mode, the management system being configured, during a first operating mode, to control the two electric machines in order for the two electric machines to simultaneously deliver different and non-zero mechanical powers or engine torques, wherein the mobile system is part of a gas generator of the combustion engine.

17. The aircraft according to claim 16, wherein the two electric machines simultaneously deliver different and non-zero engine torques, the engine torque of one of the two electric machines is not regulated and the engine torque of the other electric machine is regulated.

18. The aircraft according to claim 16, wherein each electric machine delivers a maximum power dimensioned to start the combustion engine alone during a second operating mode, the management system being configured during the first operating mode to control one of the two electric machines to deliver the maximum power and the other electric machine to deliver an additional power.

19. The aircraft according to claim 16, wherein the management system is configured during a second operating mode to make only one of the two electric machines operate.

\* \* \* \* \*